Oct. 28, 1958   E. R. AINSWORTH ET AL   2,858,111
NON-FREEZING RADIATOR TUBE SECTION
Filed Oct. 14, 1957
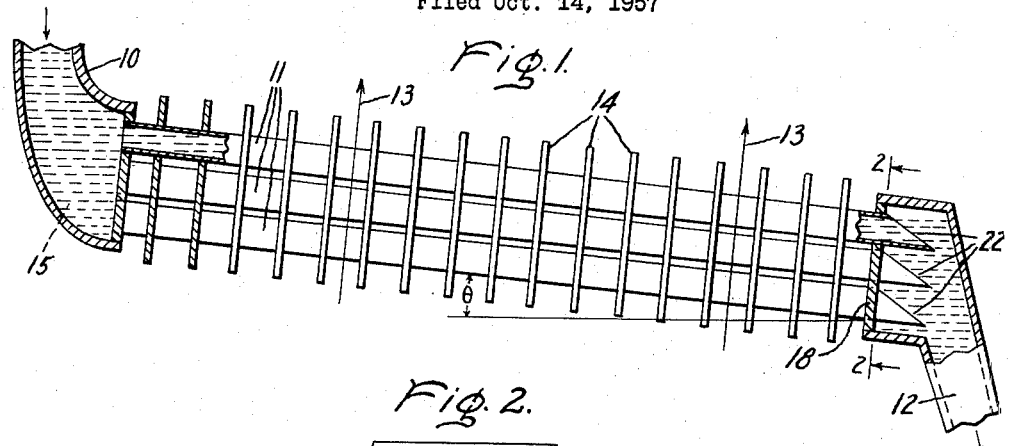
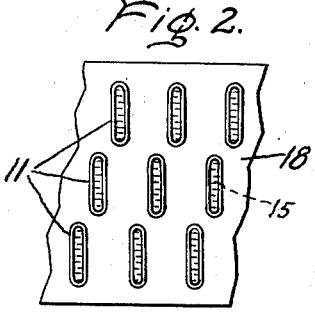
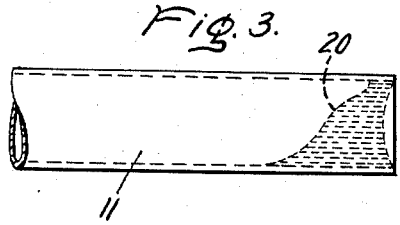
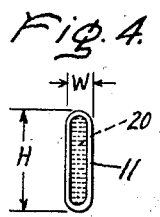
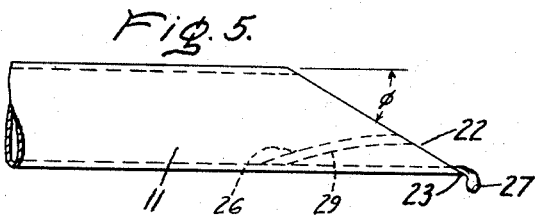
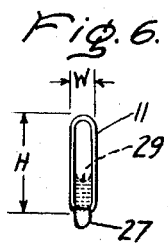
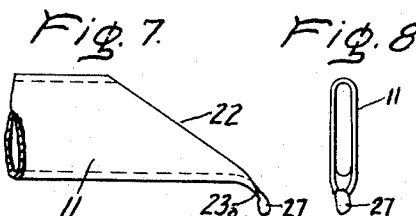
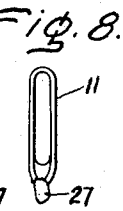
Inventors:
John C. Aydelott,
Ernest R. Ainsworth,
by David P. Ogden
Their Attorney.

United States Patent Office 2,858,111
Patented Oct. 28, 1958

2,858,111
NON-FREEZING RADIATOR TUBE SECTION

Ernest R. Ainsworth and John C. Aydelott, Erie, Pa., assignors to General Electric Company, a corporation of New York Application October 14, 1957, Serial No. 690,144

7 Claims. (Cl. 257—124)

Our invention relates to a radiator design, and, more particularly, to a radiator tube which will not plug with water when draining and thus will avoid freezing in cold climates.

Since the advent of the internal combustion engine, the transportation industry and others have been faced with the problem of efficiently removing excess combustion heat from the region of the combustion chamber. Air cooled engines were tried in the automotive industry and discarded. Water cooled engines, although complicated, have proven most satisfactory in many cases and are used exclusively in the diesel-electric locomotive. However, with the operation of an internal combustion engine in ambient temperatures which range to over 100° F., requiring a large cooling system, and to more than 40° F. below zero, the problem of providing adequate means for the prevention of freezing in cold weather has sorely tried all owners of such engines.

Anti-freeze compounds, as acceptable to the automobile owner, often are unsuitable for locomotive operation. Cost is a considerable item because of the amount of water necessary in the larger cooling system of a diesel engine. Moreover, the temperature at which the locomotive diesel engines operate are often so high (185–200° F.) that anti-freeze evaporation can be avoided only by the use of the more expensive polyhydric alcohol compounds. However, use of polyhydric alcohol is impractical because frequent leaks into the lubricating oil would ruin all bearings of the engine. Furthermore, rust inhibitors which must be added frequently to the cooling system are incompatible with polyhydric alcohol.

It is accepted practice to keep the diesel engine, when idling, at approximately the same temperature as when operating under full load conditions. A simple means of accomplishing this is to circulate the cooling water through the engine without its being cooled in the radiator. In cold weather if the water in the radiator is stagnant for even a short time, it is subject to freezing. When engines are shut down for long periods in extremely cold weather, it is customary to provide auxiliary heating which is economical for the engine itself with its relatively small exposed surface, but would be uneconomical if the radiator were in the system. Therefore, the practice in the locomotive industry is to drain the radiator to avoid freezing when heat dissipation is not required in cold weather.

In the locomotive arrangement, most parts must be accessible for maintenance without, insofar as possible, the removal of any other parts. Location of the radiator in the locomotive roof permits it to be lifted off easily in whole or in part for maintenance. At the same time, other locomotive components such as equipment blowers, braking resistor panels, oil filters, oil coolers, and water and oil pumps are accessible from the side. Location of the radiator in the roof also permits it to drain by gravity into a sump tank. Moreover, location of the sump tank at a relatively high level is desirable to allow drainage of the radiator without lowering the water in the engine to a dangerous level. Location of the sump tank at a high level also maintains a head of water on the water circulating pump which helps avoid cavitation or vapor lock. All of these considerations in a locomotive of limited height require the locomotives' radiators to be substantially horizontal.

In order to provide sufficient cooling of large engines in hot weather, as many as 6 or 8 radiator sections must be used, each section having several square feet of cooling surface through which several hundred gallons of hot water are pumped and tens of thousands of cubic feet of air are blown each minute.

However, in cold weather this many radiator sections would not receive enough hot water to prevent internal freezing therein whereby certain of the radiator sections must be disconnectable from the cooling system. When disconnected in freezing weather, either because fewer are necessary for proper cooling or because of the system shutdown, radiator sections must be drained to prevent surface tension from plugging them with freezable water. Such a water plug, when frozen, will prevent readmission of hot water. This will damage the radiator tubes and/or prevent proper cooling of the engine to render the locomotive inoperative.

Therefore, an object of our invention is to provide a simple, inexpensive radiator tube having a spout configuration enhancing effective drainage.

Briefly, in accordance with our invention, we have provided a radiator tube section having a spout on the drainage end of each tube to enhance effective drainage despite surface tension or capillary action and thus prevent plugging with water and subsequent freezing.

The subject matter which we regard as our invention is particularly pointed out and distinctly claimed in the concluding portion of this specification. Our invention, however, as to its organization and method of operation together with further objects and advantages thereof will best be understood by reference to the following description taken in connection with the accompanying drawing, in which:

Fig. 1 shows a plan side view of radiator tubes embodying our invention;

Fig. 2 is an end view taken along the line 2—2 of the radiator tubes shown in Fig. 1;

Fig. 3 is a side view of the end of a tube illustrating the formation of a water or ice plug therein;

Fig. 4 is an end view of the tube shown in Fig. 3;

Fig. 5 is a side view of a tube illustrating a modification of our invention;

Fig. 6 is an end view of the tube shown in Fig. 5;

Fig. 7 is an end view of a tube illustrating another modification of our invention; and Fig. 8 is an end view of the tube shown in Fig. 7.

Referring now to the drawing, in which like numbers refer to similar parts, we have shown in Fig. 1 an inlet pipe 10 hydraulically connected to supply hot water to a section of several similar radiator tubes 11. The water flows through the tubes 11 to an outlet or drain pipe arrangement which is connected to a storage tank (not shown).

In order that forced cooling air, as indicated by the upwardly projecting arrows 13, will remove most effectively the heat of the water from the tubes 11, we have provided the usual vanes 14 connected to substantially increase the effective surface of the tubes 11. Since it is often most practicable to mount the radiators adjacent to the roof of a locomotive, the radiators must be mounted nearly horizontal as shown in Fig. 1 and the tubes will have their major cross-sectional axis in a vertical plane. In order to use a minimum of headroom within the locomotive while maintaining a natural drainage of the water 15 from within them, the radiator tubes 11 must be tilted from horizontal by an angle θ of not more than 15 degrees.

In Fig. 2, we have shown three offset horizontal rows of the tubes 11 and an end plate 18 to illustrate one of the accepted arrangements of these tubes whereby cooling air will engage each of the tubes 11.

In order to understand thoroughly the problem which we have solved, it is necessary to understand completely the requirements of a good heat transfer radiator design. First, it is necessary to provide a radiator tube made of a thermally conductive material adapted to carry the hot water 15, and having a determinable wall thickness, volume and outer surface area adapted to contact the forced cooling air. The present standard shape provides a predetermined amount of thermally conductive surface within the tubes 11 for the hot water per cubic foot per degree per minute. Thus, if a radiator section is designed to cool 100 gallons per minute of hot water from 185° to 175° F., the amount of inner surface of the cooling tubes is predetermined. If the volume of hot water is increased of if the ambient is raised, the total length of tubing must be increased. Hence, since the individual tube length is determined by the space available in the locomotive structure and the necessary cooling is determined by the heat of the engine and the temperature ambients, the number of tubes having a surface engaging the air may be computed easily.

The radiator art is highly developed and the most effective tube cross-section has been substantially standardized. The tubes are narrow (as shown in Fig. 2) to minimize resistance to air flow and at the same time provide a large heat transfer surface between the water and the air. An efficient radiator provides maximum heat transfer from the water to the air in minimum space. Because the quantities of heat to be dissipated are so great on a diesel-locomotive and all space is at a premium in the locomotive, it is necessary to use highly efficient radiators having narrow tubes which, because of their efficient heat transfer characteristics, are most vulnerable to freezing.

With the radiators designed for maximum efficiency for cooling the water a predetermined amount, we have found the usual (inside) dimensions of the tubing is .1" in width and .625" in height. These tubes 11 have vertical side walls which are substantially parallel. The top and bottom of the tubes are curved to connect the flattened side walls. In order to simplify the following discussion, we will refer to this tube shape as "oval."

We have found cutting these standard size oval tubes at a 90° angle (as shown in Fig. 3) will cause them to plug completely with water regardless of the slope of the tube (angle θ). In fact, because of surface wetting or tension of the water, capillary action and the narrow configuration of these standard efficient cooling radiator tubes, water will invariably close the end of the tubes 11 as shown by the dashed line 20 in Fig. 3. Because of efficient heat transfer design, this water will freeze almost immediately when the radiators are cooled with air having an ambient temperature below zero degrees Fahrenheit. Since the air temperature is often much lower than this, the permanent plugging of the tubes due to ice formation is a severe problem.

According to our invention, we have provided a drain spout 22 at the lower end of the radiator tube 11 as shown in Figs. 1, 5 and 7 which will inhibit the formation of a water plug in the end of the tube. The outermost tip 23 of the spout 22 is at the lowest point of the tube 11. We prefer to have the spout 22 cut at an angle φ of about 30° from the axis of the tube to reduce the size of the water plug or the ice plug from the dashed line shown at 20 in Fig. 3 to the dashed line shown at 26 in Fig. 5.

We have found that the surface tension of the cooling water can be used to provide improved drainage effectiveness. Since the surface tension is one of the main causes of the plugging, utilization of this characteristic will tend to prevent variations of the water quality from effecting plugging. By the same phenomenon which tends to pull the water to the top of the tube 11 as shown by the dashed line 20, the surface tension will tend to pull the water out of the tube if a downwardly curving radius is provided at the tip 23 of the spout 22. One means of accomplishing this is the addition of a drop 27 of solder to the tip 23 of the spout 22 (as shown in Fig. 5) to provide a downwardly curving radius to reduce the water plug level to the range of the dashed line 29. A similar reduction in level will occur with the downward flaring, bending or deformation of the tip 23a as shown in Fig. 7.

With the size and shape of the tubing fixed by the radiator industry, and the slope of the radiators limited to approximately 15° by the location of the radiators in the locomotive, we have found that without a curved tip the angle φ must be less than 45° to prevent the formation of water plugs using distilled water. Also, with clean water and the angle θ at 5°, the angle φ must be 20° or less. The addition of the curvature of the tip 23a by the solder drop 27 prevents plugging with the angle θ equal to 5° and the angle φ less than 35°.

With our invention, we have found that a standard oval radiator tube have a 15° angle φ, both a downward projecting tip 23a and a solder drop 27 (as shown in Fig. 7) will drain with only a 2° tilt angle θ. However, track conditions may cause the locomotive to stop on a 5° or more superelevated or banked track. Thus, we prefer that the minimum angle θ be about 10°.

Contaminants usually affect the surface tension and the likelihood of plugging. Rust inhibitors have a detrimental effect while most salts or oils are beneficial and tend to lower surface tension. Also, if the radiator tubes are drained while the locomotive is vibrating (in motion) the likelihood of plugging is reduced. However, since the effect of contaminants or vibrations is not consistent, we have found that as a practical matter they do not materially affect the problem.

While we have illustrated and described particular embodiments of our invention, other modifications will occur to those skilled in the art. We intend, therefore, to cover in the appended claims all such modifications as fall within the true spirit and scope of our invention.

What we claim as new and desire to secure by Letters Patent of the United States is:

1. In combination with an oval radiator tube open at the upper end for receiving a freezable fluid, means for preventing the fluid from plugging the lower end of the tube when the fluid is no longer received at the upper end comprising, a downwardly inclined spout having its peripheral edge at an angle of less than 45° relative to the longitudinal axis of the tube.

2. In combination with an oval-radiator tube open at the upper end for receiving freezable fluid, means for preventing the fluid from plugging at the lower end of the tube when the fluid is no longer received at the upper end comprising, a downwardly inclined spout having its peripheral edge at an angle of less than 45° relative to the axis of the tube to form a tip at the lowest point thereof, said tip having an outwardly curved inner surface.

3. In combination with an oval radiator tube having its major cross-sectional axis in a vertical plane and being open at the upper end for receiving freezable fluid, means for preventing the fluid from plugging the lower end of the tube when the fluid is no longer received at the upper end comprising, a downwardly inclined spout having its peripheral edge at an angle an angle of 30° relative to the axis of the tube to form a tip at the lowest point thereof, said tip being bent outwardly to provide an outwardly curving inner surface.

4. In combination with an oval radiator tube having its major cross-sectional axis in a vertical plane and being open at the upper end for receiving a freezable fluid, means for preventing the fluid from plugging at the lower end of the tube when the fluid is no longer received at the upper end comprising, a downwardly inclined spout having its opening at an angle of 30° relative to the axis of the tube to form a tip at the lowest point thereof, said tip having a drop of downwardly projecting solder thereon to provide an outwardly curving inner surface.

5. In combination with an oval radiator tube having its major cross-sectional axis in a vertical plane and being open at the upper end for receiving a freezable fluid, means for preventing the fluid from plugging at the lower end of the tube when the fluid is no longer received at the upper end comprising, a downwardly inclined spout having its open edge at an angle of 30° relative to the axis of the tube to form a tip at the lowest point thereof, said tip being bent outwardly to provide an outwardly curving inner surface, and a drop of downwardly projecting solder on said tip.

6. A radiator adapted to prevent water or ice plugs in its tubes when drained comprising, a radiator section having a plurality of water tight tubes, said tubes being mounted to have a minimum effective drainage slope of at least two degrees, first conduit means hydraulically connected to the raised ends of said tubes for admitting hot water thereto, second conduit means connected to the lower ends of said tubes for receiving cooled water therefrom, the lower end of each of said tubes being severed at a downwardly projecting angle to provide a spout for preventing the water from forming a film thereacross when said first conduit means has its supply of water disconnected.

7. A radiator adapted when drained to prevent residual water or ice plugs in the tubes comprising, a radiator section having a plurality of water tight tubes, said tubes being mounted to have a normal drainage slope of at least two degrees, first conduit means hydraulically connected to the raised ends of said tubes for admitting hot water thereto and second conduit means connected to the lower ends of said tubes for receiving cooled water, the lower end of each of said tubes being severed at a downwardly projecting angle to provide a spout for preventing the water from forming a film thereacross when said first conduit means has its supply of water disconnected whereby said tubes are prevented from plugging with freezable water, said spout having a tip at its lowest extremity, said tip having an outwardly curved inner surface to enhance drainage.

References Cited in the file of this patent

UNITED STATES PATENTS

| 1,576,756 | Muir | Mar. 16, 1926 |
| 1,851,720 | Modine | Mar. 29, 1932 |

FOREIGN PATENTS

| 23,630 | Great Britain | Nov. 21, 1901 |